United States Patent

[11] 3,617,690

[72] Inventors Kiyoshi Terai
Ashiya;
Sotaro Yamada, Tarumiku Kobe; Nagano
Tsuneo, Takarazuka, all of Japan
[21] Appl. No. 18,900
[22] Filed Mar. 12, 1970
[45] Patented Nov. 2, 1971
[73] Assignee Kawasaki Jukogoyo Kabushiki Kaisha
Kobe, Japan

[54] AUTOMATIC NARROW-GAP JOINT WELDING
METHOD WITH MULTIPLE ELECTRODES
8 Claims, 5 Drawing Figs.

[52] U.S. Cl........................................... 219/137,
219/76
[51] Int. Cl............................................ B23k 9/00
[50] Field of Search............................ 219/61, 76,
74, 131, 137, 130, 124

[56] References Cited
UNITED STATES PATENTS

| | | | |
|---|---|---|---|
| 2,416,379 | 2/1947 | Cohn.......................... | 219/137 |
| 2,812,419 | 11/1957 | Chyle.......................... | 214/137 X |
| 3,123,702 | 3/1964 | Keidel et al.................. | 219/130 X |
| 3,328,556 | 6/1967 | Nelson et al. ................ | 219/137 |
| 3,467,809 | 9/1969 | Lorentz, Jr. ................. | 219/124 |
| 3,519,789 | 7/1970 | Nelson et al.................. | 214/137 X |

Primary Examiner—J. V. Truhe
Assistant Examiner—George A. Montanye
Attorney—Milford A. Juten ABSTRACT: A method of welding a pair of horizontally disposed plates with a narrow groove between adjacent edges by means of electrodes projecting upwardly into the groove and in which a pair of electrodes form beads at the top edge of each surface of the groove and a single electrode connects the beads formed by the double electrodes and repeating the process to completely fill the groove.

PATENTED NOV 2 1971 3,617,690

INVENTORS
KIYOSHI TERAI,
SOTARO YAMADA,
TSUNEMI NAGANO

AUTOMATIC NARROW-GAP JOINT WELDING METHOD WITH MULTIPLE ELECTRODES

The present invention relates to welding and more particularly to welding overhead, particularly where two plate portions are to be secured to each other when access to the groove between the plates cannot be obtained from the upper surface.

Heretofore, plates have been welded together to made a strong weld but where the welding must be done overhead, difficulty has been experienced because the amount of heat must be limited to prevent the fluid-welding metal from dropping downwardly and consequently there has been substantial limitation on the speed with which welding could be accomplished in an overhead weld.

An object of the present invention is to avoid the disadvantages of the prior art in making a weld in an overhead or ceiling.

Another object is to provide a method of welding using pairs of electrodes and single electrodes spaced in the direction of feed.

Other and further objects will be apparent as the description proceeds and upon reference to the accompanying drawings, wherein.

Figure 1:
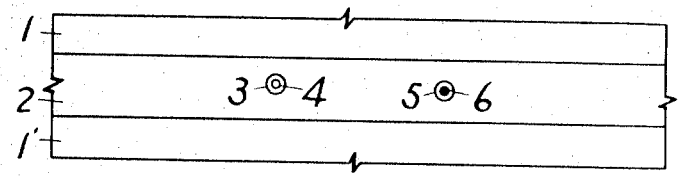
FIG. 1 is a plan view of a welding process according to the prior art using single electrodes.
Figure 2:
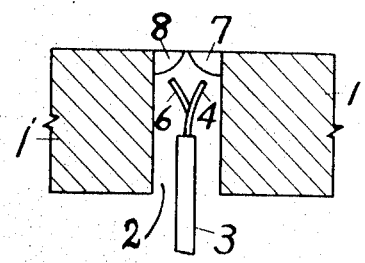
FIG. 2 is a fragmentary section showing the electrodes directed to opposite surfaces of the groove being filled.

Referring more particularly to the drawing, a pair of plates 1 and 1' according to the prior art are arranged with one side edge of each plate facing the corresponding side edge of the other plate, and an electrode 4 carried by nozzle 3 and an electrode 6 carried by nozzle 5 extend upwardly from beneath and form the beads 7 and 8, as shown in FIGS. 1 and 2. It is difficult to produce sufficient depth of heating in the welding operation and still maintain the fluid bead in a condition to remain at the upper top edge of the side edge of the plate and consequently, the prior art has not been satisfactory for welding which must be done from beneath.

The present invention has a basic unit of a two-piece set of two electrodes of reversed polarity of the MIG (metal inert gas welding) method on both sides of the groove formed by the adjacent side edges of the plates 9 and 9'. The electrodes are arranged with multielectrode heads which employ an arrangement of the electrodes of 3n-type (in which n=1,2,...all integers) and in which the double and single electrodes are alternately placed in the direction of weld formation as the beads are progressively formed.

Figure 3:
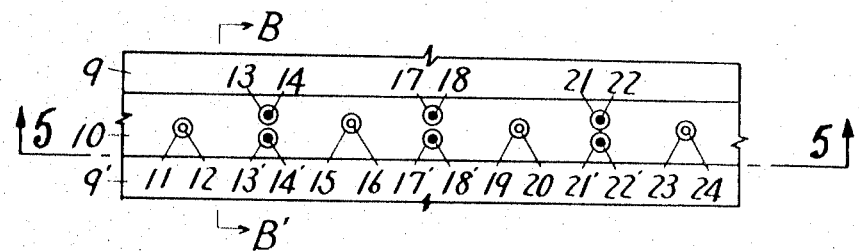
FIG. 3 is a plan view of fragments of plates being welded together showing the alternate arrangement of single and double electrodes.

Referring to FIG. 3, single nozzles and electrodes are alternately positioned between two-piece set of nozzles and electrodes as shown. The electrodes may be mounted on a suitable support or may be manipulated by hand, but the series of electrodes move in the direction of weld formation.

Figure 4:
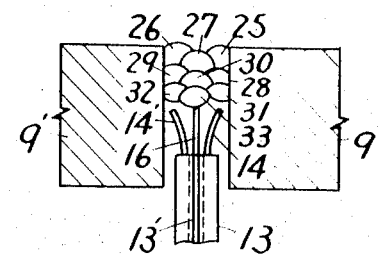
FIG. 4 is a section taken on line B—B' of FIG. 3 showing the progressive formation of the welding beads.

As shown, single nozzles are indicated at 11, 15, 19, and 23 while double nozzle electrodes are shown at 13, 13'; 17, 17'; and 21, 21'. The nozzles carry the inert gas to the area being welded. Each of the nozzles has an electrode wire extending therefrom to supply the metal required for the welding beads, as shown in FIG. 4. The pair of nozzles 13, 13' guide the electrodes 14, 14' as shown in FIG. 4 to the adjacent surfaces of the adjacent side edges of the plates 9, 9' to form beads 25 and 26 which are somewhat similar to beads 7 and 8 of FIG. 2. Then the nozzle 15, by means of its electrode 16, forms the bead 27 between beads 25 and 26. Similarly, nozzle 17 and 17' then form the beads 28 and 29 and thereafter the nozzle 19 forms the bead 30. Nozzle 21 and 21' then form beads 31 and 32 and thereafter nozzle 23 forms the bead 33 by its electrode 24.

It will be noted that the direction of weld formation may be from left to right or from right to left. For the purpose of illustration in FIG. 4 it is assumed that the work plates 9 and 9' move to the right relative to the nozzles and that FIG. 4 shows the second path of the work past the welding nozzles so that the groove between the plates may be completely filled with the welding beads.

The series of automatic narrow-gap weldings is the MIG welding method in which the arc is shielded with simple gas such as Ar, He, $CO_2$ or their mixture gases at a proper ratio and the shieldings are properly performed.

Direct current is used and a reverse polarity is employed in a black besmeared two-piece set and either reverse polarity or straight polarity can be employed in the single nozzle. The employment of reverse polarity in the above-mentioned polarity is, as mentioned later, to stabilize the arc in which deep penetration is obtained so that satisfactory fusion may be made.

Figure 5:
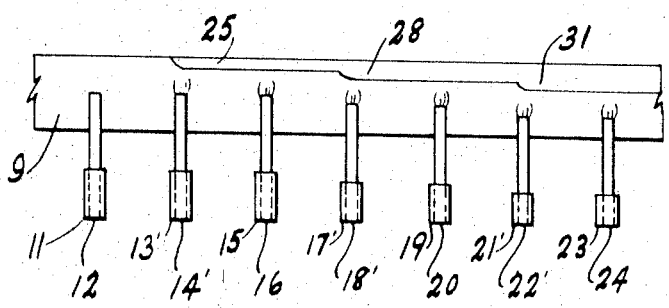
FIG. 5 is a section taken on line 5—5 of FIG. 3 showing the progressive weld formation as the welding beads are serially applied.

Assuming that the plates 9, 9' are moving to the right or the series of nozzles 11, 13, 13', 15, 17, 17', 19, 21, 21', and 23 are relatively moved to the left, the location of the various nozzles and of the electrodes supplied thereto in the form of wire are arranged to produce the progressive building up of the welds as shown in FIG. 5, for example.

Assuming that the group of nozzles move toward the left, the nozzle 11 and the electrode 12 are rendered inoperative by disconnecting the current to the electrode 12 and the first welding of beads 25 and 26 onto plates 9 and 9' is accomplished by nozzles 13 and 13' and bead 27 joining the beads 25 and 26 is accomplished by single nozzle 15. Thereafter nozzles 17 and 17' produce the bead 28 and 29 and bead 30 is applied by nozzle 19 after which nozzles 21 and 21' form beads 31 and 32 and finally nozzle 23 forms bead 33 joining the beads 31 and 32.

For the purpose of illustration in FIG. 5, the nozzles have been identified by a line showing where they become effective and showing the effective progression of the weld formation. It will be apparent that the number of nozzle electrodes may be increased so that the entire depth of weld is filled in the groove with a single pass of the plates past the welding nozzle.

Also, the welding may be reversed by moving the plates to the left relative to the nozzles in which circumstances the electrode 24 of nozzle 23 would be disconnected from the source of electric current, while nozzle 11 and its electrode 12 will be connected to the source of current. Consequently, the operation may be accomplished by moving the plates in one direction and then moving the plates in the opposite direction at the same time that the electrode 11 is disconnected from the source of current and nozzle 23 is connected to the source of current or the nozzle 23 is disconnected from the source of current while nozzle 11 is connected to the source of current. It will be noted that the number of electrodes may be increased to any desired number to obtain the desired depth of weld in a single passage of the work.

With the existing automatic narrow-gap welding method in which two electrodes are employed, when welding is done in any but a downward position, the welding input heat is limited in order to prevent the welding metal from running down and get a beautiful bead shape of every layer, which limits the width of the bead and therefore the maximum value of the space of the narrow groove. And again the minimum value of the groove gap is limited to allow the electrode to be inserted in the groove, the allowance range is small, and a highly exact gap of the groove is required. With this invention, however, as each electrode of basic unit consisting of a double and a single electrode forms a layer of bead, it is possible to get a wide-ranged bead in an overhead position, and the allowance range of the gap of the groove is wide, and even where a great angular variation and lateral contraction are caused in the welding of a thick plate and the gap of the groove varies at every welding operation, sound welding can be performed easily. As the electrodes supplied from the double nozzle bend respectively toward the surfaces of the groove and are of reverse polarity, the arc is stabilized and a deep penetration can be obtained.

Therefore, fusion between weld metal and base metal or fusion between the weld beads is satisfactory, and the imperfect fusion of metal between the beads and between the base metal and weld material of previous methods is avoided by the present invention.

It will be apparent that changes may be made within the spirit of the invention as defined by the valid scope of the claims.

We claim:

1. A single-pass method of overhead electric welding with electrodes carrying welding wires and electric power comprising arranging plates with the edge surfaces of a pair of horizontally disposed plates arranged with one side edge of each facing the corresponding side edge of the other plate forming a narrow groove between the edge surfaces of said side edges of said plates thereby providing a top edge on each side edge surface, applying a bead to the top edges of the adjacent edge surfaces of said plates by means of a first pair of electrodes extending upwardly into the groove with one bead on each top edge, applying a centrally disposed bead by means of a trailing first electrode to the said beads on the top edges of the edge surfaces of the groove thereby joining the beads of the top edges of the surfaces of the groove forming an integral welded connection between the plates, thereafter applying second beads onto the first beads on the top edges of the groove surfaces by means of a second pair of electrodes trailing said first single electrode and then applying a centrally disposed bead by a second single-trailing electrode to the said beads which are exposed and repeating the operation until the groove is completely filled in one pass.

2. The invention according to claim 1 in which the welding wire of one electrode of each pair is bent toward one surface of the groove and the other welding wire of the other electrode of each pair is bent toward the other surface of the groove.

3. The invention according to claim 1 in which the electrodes are maintained in a definite spaced relation.

4. The invention according to claim 1 in which the electrodes are carried by nozzles directing inert gas to the point of welding.

5. The invention according to claim 1 in which there are a plurality of pairs of nozzles directing inert gas to the beads at the top edges and nozzles for directing inert gas to the single electrodes which are arranged in spaced relation and are moved in a longitudinal direction relative to the groove.

6. The invention according to claim 5 in which the electrodes and nozzles of said pairs of electrodes are directed outwardly to the surface of said grove.

7. The invention according to claim 5 in which the number of electrodes is $3n$ where $n$ is an integer and wherein each electrode of the electrode pairs is directed to opposite surfaces of the groove and are of reverse polarity.

8. The invention according to claim 7 in which the single electrodes are of reverse polarity.

* * * * *